(12) United States Patent
Kanemitsu

(10) Patent No.: US 10,519,630 B2
(45) Date of Patent: Dec. 31, 2019

(54) POSTURE CALCULATION DEVICE OF WORKING MACHINERY, POSTURE CALCULATION DEVICE OF EXCAVATOR, AND WORKING MACHINERY

(71) Applicant: Komatsu Ltd., Tokyo (JP)

(72) Inventor: Yasuo Kanemitsu, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 178 days.

(21) Appl. No.: 15/657,483

(22) Filed: Jul. 24, 2017

(65) Prior Publication Data
US 2017/0321395 A1 Nov. 9, 2017

Related U.S. Application Data

(63) Continuation of application No. 14/385,260, filed as application No. PCT/JP2014/063246 on May 19, 2014, now Pat. No. 9,745,726.

(51) Int. Cl.
*E02F 9/26* (2006.01)
*G01C 1/00* (2006.01)
(Continued)

(52) U.S. Cl.
CPC ............... *E02F 9/264* (2013.01); *G01C 1/00* (2013.01); *E02F 3/32* (2013.01); *E02F 3/435* (2013.01)

(58) Field of Classification Search
CPC .. E02F 9/264; E02F 3/435; E02F 3/32; G01C 21/16; G01C 9/00; G01C 1/00
See application file for complete search history.

(56) References Cited

U.S. PATENT DOCUMENTS 5,860,480 A 1/1999 Jayaraman et al.
7,650,252 B2 1/2010 Douglas
(Continued)

FOREIGN PATENT DOCUMENTS

CN 103733078 A 4/2014
DE 19815894 A1 10/1998
(Continued)

OTHER PUBLICATIONS

Yan Shiliang et al., "Improved complementary filter for attitude estimation of micro air vehicles using low-cost inertial measurement units," Journal of Computer Applications, vol. 33, Jul. 1, 2013, 2078-2082 and its English abstract is included.(cited in the Mar. 14, 2018 OA, issued for in the corresponding CN201480000871.1).
(Continued)

*Primary Examiner* — Alan D Hutchinson
(74) *Attorney, Agent, or Firm* — Locke Lord LLP

(57) ABSTRACT

A posture calculation device of working machinery includes: a measuring device configured to detect an angle speed and acceleration; a posture angle calculation unit configured to obtain a posture angle of the working machinery from the detected angle speed and the detected acceleration; a first complementary filter to which a first cutoff frequency is set and configured to decrease a noise included in the obtained posture angle to output a first posture angle; a second complementary filter to which a second cutoff frequency different from the first cutoff frequency is set and configured to decrease a noise included in the obtained posture angle to output a second posture angle; and a switching unit configured to switch between the first posture angle and the second posture angle to output the first posture angle or the second posture angle according to a state of the measuring device.

10 Claims, 9 Drawing Sheets

(51) Int. Cl.
  *E02F 3/32* (2006.01)
  *E02F 3/43* (2006.01)

(56) References Cited

U.S. PATENT DOCUMENTS

| | | |
|---|---|---|
| 9,835,644 B2 | 12/2017 | Ten Kate |
| 2009/0312974 A1 | 12/2009 | Douglas |
| 2012/0130601 A1 | 5/2012 | Banerjee et al. |
| 2013/0080112 A1 | 3/2013 | Friend |
| 2014/0156216 A1 | 6/2014 | Ten Kate |

FOREIGN PATENT DOCUMENTS

| | | |
|---|---|---|
| DE | 112009001466 T5 | 5/2011 |
| JP | 2005-061024 A | 3/2005 |
| JP | 2008-256381 A | 10/2008 |
| JP | 2010-053609 A | 3/2010 |
| JP | 4807301 B2 | 11/2011 |
| JP | 2013-170904 A | 9/2013 |
| JP | 2014-084683 A | 5/2014 |

OTHER PUBLICATIONS

International Search Report and Written Opinion dated Aug. 12, 2014, issued for PCT/JP2014/063246.
Jay Esfandyari et al., "Solution for MEMS sensor fusion," Mouser Electronics, Oct. 28, 2011, 5 pages and English translation thereof.
Tae Suk Yoo etc. "Gain-Scheduled Complementary Filter Design for a MEMS Based Attitude and Heading Reference System," Sensors 2011.11, 3816-3830. (cited in the May 2, 2017 KR Decision to Grant a Patent).

FIG.8

|     | A&B | NOT(A&B) |
|-----|-----|----------|
| ON  | θ2  | θ2       |
| OFF | θ1  | θ2       |

TB

POSTURE CALCULATION DEVICE OF WORKING MACHINERY, POSTURE CALCULATION DEVICE OF EXCAVATOR, AND WORKING MACHINERY

This application is a continuation application of U.S. application Ser. No. 14/385,260 filed Sep. 15, 2014, which is a National Stage Entry of PCT/JP2014/063246 filed May 19, 2014.

FIELD

The present invention relates to a posture calculation device of working machinery, a posture calculation device of an excavator, and working machinery.

BACKGROUND

In recent years, there is working machinery, such as an excavator or a bulldozer, which detects a position of the working machinery and performs work management, and performs construction management based on position information of the working machinery and construction information that indicates geographical features of a construction site (for example, Patent Literature 1).

CITATION LIST

Patent Literature

Patent Literature 1: Japanese Patent Application Laid-open No. 2005-61024

SUMMARY

Technical Problem

When a position and a posture of a working machine included in the working machinery are obtained, it is necessary to accurately obtain information related to an inclination of the working machinery. For example, an inertial measurement unit (IMU) is mounted on the working machinery, and posture angles, such as a roll angle and a pitch angle, can be obtained from a detection value of the IMU as the information related to the inclination of the working machinery. When the posture angles of the working machine are obtained from the detection value of the IMU, accuracy of the posture angles influences accuracy of the obtained position and posture of the working machine, and the like.

An objective of the present invention is to suppress a decrease in accuracy of a posture angle when the posture angle of working machinery is obtained.

Solution to Problem

According to the present invention, A posture calculation device of working machinery includes: a measuring device provided in the working machinery, and configured to detect an angle speed and acceleration; a posture angle calculation unit configured to obtain a posture angle of the working machinery from the angle speed and the acceleration detected by the measuring device; a first complementary filter to which a first cutoff frequency is set, and configured to decrease a noise included in the posture angle obtained by the posture angle calculation unit to output a first posture angle; a second complementary filter to which a second cutoff frequency different from the first cutoff frequency is set, and configured to decrease a noise included in the posture angle obtained by the posture angle calculation unit to output a second posture angle; and a switching unit configured to switch between the first posture angle and the second posture angle to output the first posture angle or the second posture angle according to a state of the working machinery.

It is preferable that the first cutoff frequency is higher than the second cutoff frequency.

It is preferable that the switching unit outputs the first posture angle when having determined that the working machinery is in a quasi-stationary state, and outputs the second posture angle when having determined that the working machinery is in a dynamic state.

It is preferable that after switching from the first posture angle to the second posture angle, the switching unit corrects the second posture angle using a value obtained by subtracting of the second posture angle from the first posture angle at a time of switching as a correction value.

It is preferable that after switching from the second posture angle to the first posture angle, the switching unit corrects the first posture angle using a value obtained by multiplying of an error of the second posture angle at the time of switching by a coefficient that is larger than 0 and smaller than 1 as a correction value.

According to the present invention, A posture calculation device of an excavator includes: a measuring device provided in an upper swing body of the excavator, and configured to detect an angle speed and acceleration; a posture angle calculation unit configured to obtain a posture angle of the excavator from the angle speed and the acceleration detected by the measuring device; a first complementary filter to which a first cutoff frequency is set, and configured to decrease a noise included in the posture angle obtained by the posture angle calculation unit to output a first posture angle; a second complementary filter to which a second cutoff frequency lower than the first cutoff frequency is set, and configured to decrease a noise included in the posture angle obtained by the posture angle calculation unit to output a second posture angle; and a switching unit configured to output the first posture angle when having determined that the excavator is in a quasi-stationary state, and to output the second posture angle when having determined that the excavator is in a dynamic state.

According to the present invention, Working machinery includes: the above described posture calculation device of working machinery; and a control unit configured to obtain a position of a working machine attached to the working machinery using the first posture angle or the second posture angle output from the posture calculation device of the working machinery.

The present invention can suppress a decrease in accuracy of a posture angle when obtaining the posture angle of working machinery.

BRIEF DESCRIPTION OF DRAWINGS

FIG. 8 is a diagram illustrating an example of a table used for switching of a first posture angle and a second posture angle in a modification of the present embodiment.

DESCRIPTION OF EMBODIMENTS

An embodiment for implementing the present invention (embodiment) will be described in detail with reference to the drawings.

<Overall Configuration of Working Machinery>

Figure 1:
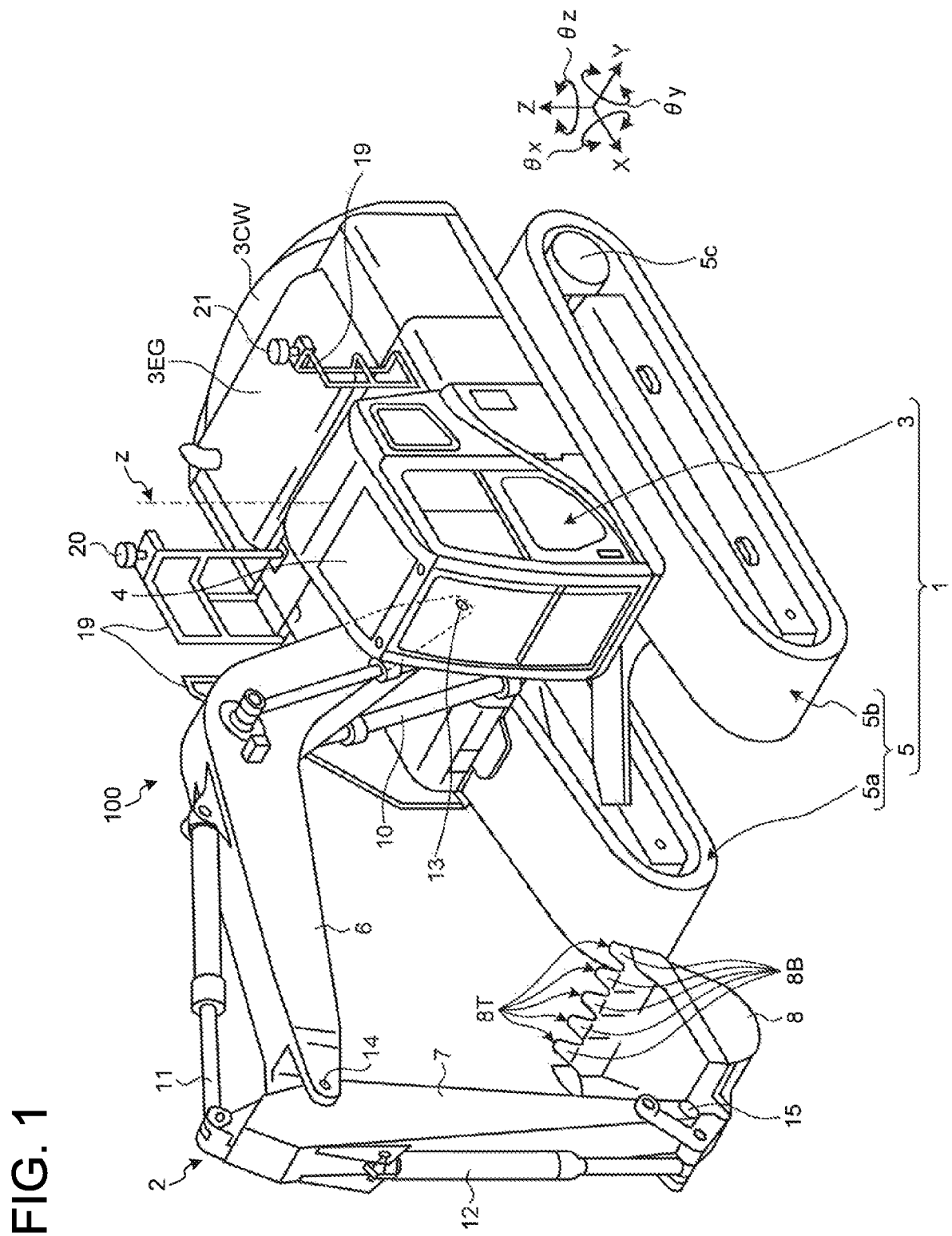
FIG. 1 is a perspective view of working machinery according to a present embodiment.
Figure 2:
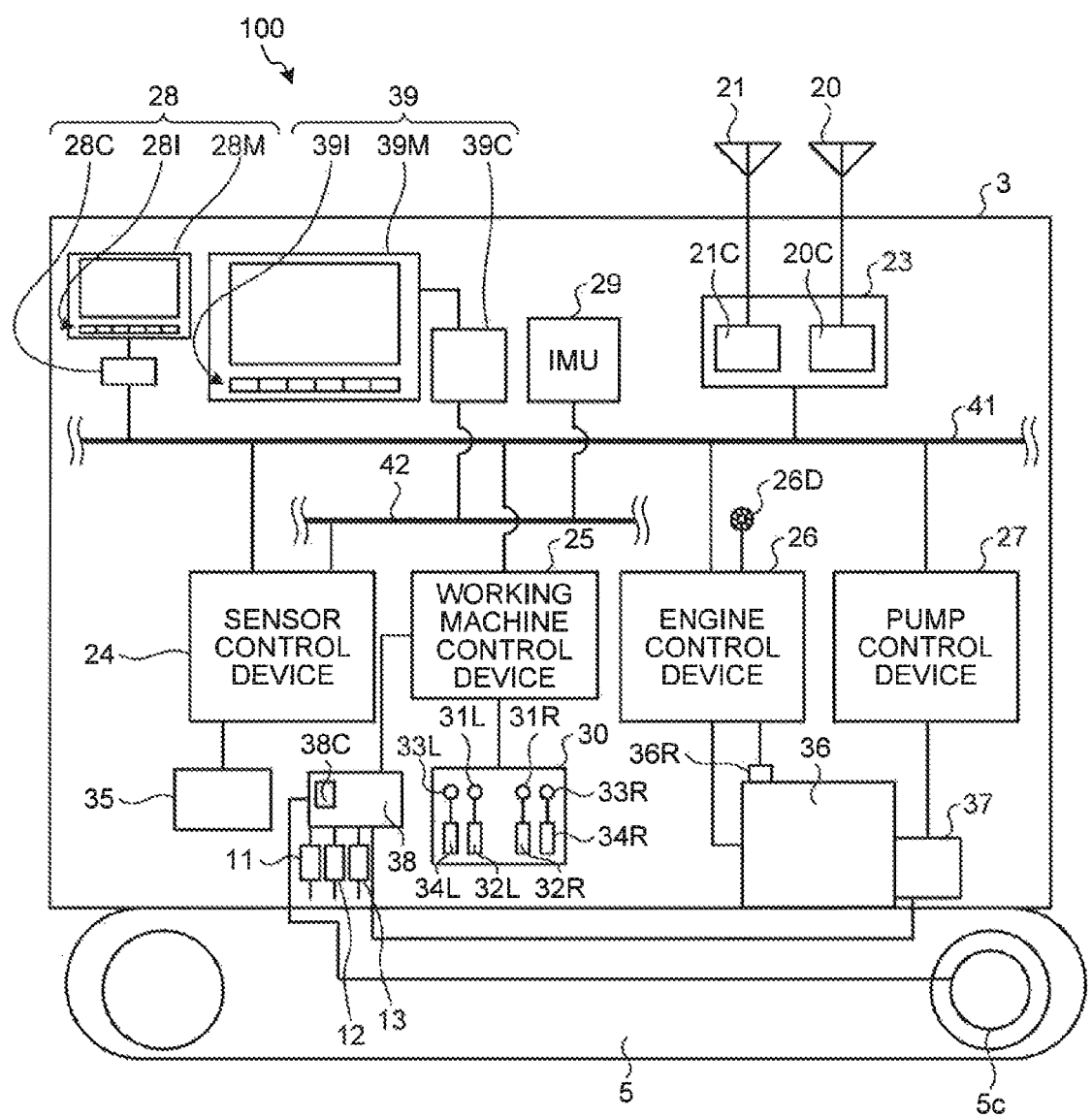
FIG. 2 is a diagram illustrating a control system of the working machinery according to the present embodiment.

FIG. 1 is a perspective view of working machinery according to the present embodiment. FIG. 2 is a diagram illustrating a control system of the working machinery according to the present embodiment. An excavator 100 as the working machinery includes a vehicle body 1 and a working machine 2. The vehicle body 1 includes an upper swing body 3 as a swing body and a traveling device 5 as a traveling body. The upper swing body 3 houses devices, such as an engine 36 as a power generation device illustrated in FIG. 2 and a hydraulic pump 37, inside an engine room 3EG. The engine room 3EG is arranged at a rear end side of the upper swing body 3. In describing the present embodiment, defining directions will be described below.

In the present embodiment, the excavator 100 uses an internal-combustion engine, such as a diesel engine, as the engine 36 as a power generation device. However, the power generation device is not limited thereto. The power generation device of the excavator 100 may be a so-called hybrid-system device that is a combination of an internal-combustion engine, a generator motor, and a storage device.

The upper swing body 3 includes an operator cab 4. The operator cab 4 is installed at a front end side of the upper swing body 3. That is, the operator cab 4 is installed at a side opposite to the side where the engine room 3EG is installed. A first display device 28 and an operation device 30 illustrated in FIG. 2 are arranged inside the operator cab 4. These devices will be described below. Handrails 19 and antennas 20 and 21 are attached to upper portions of the upper swing body 3. Details of the antennas 20 and 21 will be described below.

The traveling device 5 includes caterpillar bands 5a and 5b. One or both of hydraulic motors 5c provided at right and left sides of the traveling device 5 is (are) driven, and the caterpillar bands 5a and 5b are turned, so that the excavator 100 is allowed to travel backward and forward or to swing. The working machine 2 is attached to the upper swing body 3 at the side of the operator cab 4.

The excavator 100 may include tires instead of the caterpillar bands 5a and 5b, and may include a traveling device capable of transmitting driving force of the engine 36 illustrated in FIG. 2 to the tires through a transmission, and traveling. An example of such an excavator 100 includes a wheel-type excavator. Further, the excavator 100 may be a backhoe loader including such a traveling device having tires, and further having a structure in which a working machine is attached to the vehicle body, and the upper swing body 3 as illustrated in FIG. 1 and a swing mechanism thereof are not included. That is, the backhoe loader has the working machine attached to the vehicle body and a traveling device that constitutes a part of the vehicle body.

In the upper swing body 3, the side where the working machine 2 and the operator cab 4 are arranged is a front side, and the side where the engine room 3EG is arranged is a rear side. Facing front, the left side is a left side of the upper swing body 3, and the right side is a right side of the upper swing body 3. Also, in the excavator 100 or the vehicle body 1, the side of the traveling device 5 based on the upper swing body 3 is a lower side, and the side of the upper swing body 3 based on the traveling device 5 is an upper side. In a case where the excavator 100 is installed on a horizontal plane, the lower side is in the vertical direction, that is, in the direction of action of gravity, and the upper side is in a direction opposite to the vertical direction.

The working machine 2 includes a boom 6, an arm 7, a bucket 8, a boom cylinder 10, an arm cylinder 11, and a bucket cylinder 12. A base end portion of the boom 6 is swingably attached to a front portion of the upper swing body 3 through a boom pin 13. A base end portion of the arm 7 is swingably attached to a tip portion of the boom 6 via an arm pin 14. The bucket 8 is attached to a tip portion of the arm 7 through a bucket pin 15. The bucket 8 swings around the bucket pin 15. A plurality of blades 8B is attached to the bucket 8 at an opposite side to the bucket pin 15. An edge of a blade 8T is a tip of the blade 8B.

The bucket 8 may not include the plurality of blades 8B. That is, the bucket 8 may be a bucket that does not include the blade 8B as illustrated in FIG. 1, and in which the edge of the blade is formed into a straight shape with a steel plate. The working machine 2 may include a tilt bucket having a single blade. The tilt bucket is a bucket that includes a bucket tilt cylinder, and with which a slope or a level ground can be formed and leveled into a free form by the bucket being tilted leftward and rightward even if the excavator is on a slope land, and compaction work can be performed with a base plate. In addition, the working machine 2 may include a slope finishing bucket or a drilling attachment including a drilling chip, or the like, instead of the bucket 8.

The boom cylinder 10, the arm cylinder 11, and the bucket cylinder 12 illustrated in FIG. 1 are hydraulic cylinders driven by pressure of a working oil (hereinafter, appropriately referred to as oil pressure). The boom cylinder 10 drives and moves the boom 6 up and down. The arm cylinder 11 drives the arm 7 to revolve around the arm pin 14. The bucket cylinder 12 drives the bucket 8 to revolve around the bucket pin 15.

A hydraulic control valve 38 illustrated in FIG. 2 is provided between the hydraulic cylinders such as the boom cylinder 10, the arm cylinder 11, and the bucket cylinder 12, and the hydraulic pump 37 illustrated in FIG. 2. The hydraulic control valve 38 includes a travel control valve for driving the hydraulic motor 5c, and a working machine control valve for controlling the boom cylinder 10, the arm cylinder 11, the bucket cylinder 12, and a swing motor that allows the upper swing body 3 to swing. A working machine control device 25 illustrated in FIG. 2 controls the hydraulic control valve 38, so that flow rates of the working oil supplied to the boom cylinder 10, the arm cylinder 11, the bucket cylinder 12, the swing motor, and the hydraulic motor 5c. As a result, operations of the boom cylinder 10, the arm cylinder 11, the bucket cylinder 12, and the like are controlled.

The antennas 20 and 21 are attached to upper portions of the upper swing body 3. The antennas 20 and 21 are used for detecting a current position of the excavator 100. The antennas 20 and 21 are electrically connected with a position detection device 23 for detecting the current position of the excavator 100 illustrated in FIG. 2. The position detection device 23 detects the current position of the excavator 100 using a real time kinematic-global navigation satellite system (RTK-GNSS). (GNSS is a global navigation satellite system.) In the following description, the antennas 20 and 21 are appropriately referred to as GNSS antennas 20 and 21.

Signals according to GNSS radio waves received by the GNSS antennas 20 and 21 are input to the position detection device 23. The position detection device 23 detects installation positions of the GNSS antennas 20 and 21.

The GNSS antennas 20 and 21 are favorably installed on the upper swing body 3 at both end positions of the excavator 100, the positions being separated from each other in right and left directions, as illustrated in FIG. 1. The GNSS antennas 20 and 21 may be attached over the upper swing body 3 and to the handrails 19, as illustrated in FIG. 1. Further, the GNSS antennas 20 and 21 may be installed on upper portions of a counter weight 3CW provided at a rear end of the upper swing body 3 or posterior to the operator cab 4 and on the engine room 3EG. In any case, detection accuracy of the current position of the excavator 100 is improved if the GNSS antennas 20 and 21 are installed at positions separated from each other as much as possible. Further, it is favorable to install the GNSS antennas 20 and 21 at positions not to hinder the view of the operator.

(Control System of Excavator)

A control system of the excavator 100 will be described with reference to FIG. 2. The excavator 100 includes, as a control system, a sensor control device 24 as a posture calculation device of the working machinery, the working machine control device 25, an engine control device 26, a pump control device 27, the first display device 28, an IMU 29 as an inertial measurement unit that detects an angle speed and acceleration, and a second display device 39. These devices are installed in the upper swing body 3. For example, the IMU 29 is installed at a lower portion of the operator cab 4. The first display device 28 and the second display device 39 are installed in a vicinity of an operator's seat inside the operator cab 4.

The sensor control device 24, the working machine control device 25, the engine control device 26, the pump control device 27, the first display device 28, and the position detection device 23 are electrically connected with an in-vehicle signal line 41 installed inside the excavator 100. The sensor control device 24, the working machine control device 25, the engine control device 26, the pump control device 27, the first display device 28, and the position detection device 23 mutually communicate through the in-vehicle signal line 41. The sensor control device 24, the IMU 29, and the second display device 39 are electrically connected with an in-vehicle signal line 42 that is different from the in-vehicle signal line 41. The sensor control device 24, the IMU 29, and the second display device 39 mutually communicate through the in-vehicle signal line 42. The IMU 29 may be electrically connected with the in-vehicle signal line 41 instead of the in-vehicle signal line 42.

Various sensors 35, such as a sensor that detects strokes of the boom cylinder 10, the arm cylinder 11, and the bucket cylinder 12 illustrated in FIG. 1, a sensor that detects angles of the boom 6 and the arm 7, and a sensor that detects a swing angle of the upper swing body 3, are electrically connected to the sensor control device 24. The sensors that detect the angles of the boom 6 and the arm 7, and the swing angle are not necessarily required. The sensor control device 24 applies various types of signal processing, such as filter processing and analog/digital (A/D) conversion, to signals detected by the various sensors 35, and then outputs converted signals to the in-vehicle signal line 41.

As the sensor that detects strokes of the boom cylinder 10, the arm cylinder 11, and the bucket cylinder 12, a proximity sensor or a rotary encoder that detects expansion/contraction amounts of the hydraulic cylinders can be used. Alternatively, encoders (not illustrated) are provided at base end portions of the boom 6 and the arm 7, and a detection value of the proximity sensor or the rotary encoder that detects the expansion/contraction amounts of the hydraulic cylinders can be reset by the encoders.

The sensor control device 24 acquires signals detected by the IMU 29, to be specific, the acceleration and the angle speed, from the in-vehicle signal line 42. The sensor control device 24 obtains a posture angle of the working machinery using the acceleration and the angle speed acquired from the IMU 29, applies the filter processing according to the present embodiment to the obtained posture angle and removes a noise, and outputs the posture angle to the in-vehicle signal line 41. The posture angle is information related to an inclination of the excavator 100. The accuracy of the posture angle influences display accuracy of the position information of the edges of a blade 8T by the second display device 39 and accuracy of working machine control of the excavator 100. The accuracy of the posture angle is secured by execution of the filter processing according to the present embodiment. The filter processing according to the present embodiment will be described.

The working machine control device 25 controls operations of the working machine 2, the upper swing body 3, and the traveling device 5 illustrated in FIG. 1 based on inputs from the operation device 30. The operation device 30 includes working machine operation members 31L and 31R as operation units, travel operation members 33L and 33R, working machine operation detection units 32L and 32R, and travel operation detection units 34L and 34R. In the present embodiment, the working machine operation members 31L and 31R and the travel operation members 33L and 33R are, but not limited to, pilot pressure system levers. The working machine operation members 31L and 31R and the travel operation members 33L and 33R may be electric system levers capable of detecting operation amounts of the operation members (levers) using a potentiometer, for example.

The working machine operation members 31L and 31R are members installed at right and left sides of the operator's seat and used by the operator of the excavator 100 for operating the working machine 2, for example, and are operation levers including a grip portion such as a joystick and a bar member. The working machine operation members 31L and 31R having such a structure can be tilted backward and forward, and rightward and leftward by gripping of the grip sections. For example, by operating of the working machine operation member 31L installed on the left, the arm 7 and the upper swing body 3 can be operated, and by operating of the working machine operation member 31R installed on the right, the bucket 8 and the boom 6 can be operated.

The working machine operation detection units 32L and 32R generate pilot pressure according to inputs to the working machine operation members 31L and 31R, that is, operation content, and supply the generated pilot pressure of the working oil to the work control valve included in the hydraulic control valve 38. The work control valve is operated in accordance with the magnitude of the pilot pressure, so that the working oil is supplied from the hydraulic pump 37 to the boom cylinder 10, the arm cylinder 11, the bucket cylinder 12, and the like illustrated in FIG. 1. When the working machine operation members 31L and 31R are electric system levers, the working machine operation detection units 32L and 32R detect the inputs to the working machine operation members 31L and 31R, that is, the operation content, using a potentiometer, or the like, convert the inputs into electrical signals (detection signals), and send the signals to the working machine control device 25. The working machine control device 25 controls the work control valve based on the detection signals.

The travel operation members 33L and 33R are members installed anterior to the operator's seat, and operated by the operator for causing the traveling device 5 of the excavator 100 to travel or to swing. The travel operation members 33L and 33R are operation levers (hereinafter, appropriately referred to as travel levers) including a grip section and a bar member. Such travel operation members 33L and 33R can be tilted backward and forward by gripping of the grip section by the operator. When the two operation levers of the travel operation members 33L and 33R are simultaneously tilted forward, the excavator 100 proceeds forward, and when the two operation levers are tilted backward, the excavator 100 proceeds backward.

The travel operation members 33L and 33R may be pedals (not illustrated) that can be operated by being stepped on with foot of the operator, and are, for example, seesaw type pedals. The pilot pressure is generated similarly to the above-described operation levers by stepping on with either front sides or rear sides of the pedals, the travel control valve is controlled, and the hydraulic motor 5c is driven, so that the excavator 100 can proceed forward or backward. When the front sides of the two pedals are stepped on at the same time, the excavator 100 proceeds forward, and when the rear sides of the two pedals are stepped on, the excavator 100 proceeds backward. When the front side or the rear side of one of the pedals is stepped on, one of the caterpillar bands 5a and 5b is turned, and the traveling device 5 of the excavator 100 can swing.

As described above, when the operator wants to cause the excavator 100 to travel, the operator can drive the hydraulic motor 5c of the traveling device 5 by either tilting the operation levers forward or backward with hands, or stepping on the front sides or the rear sides of the pedals with foot. As illustrated in FIG. 2, there are two pairs of the travel operation members 33L and 33R and the travel operation detection units 34L and 34R. By operating of the left-side travel operation member 33L, the left-side hydraulic motor 5c can be driven and the left-side caterpillar band 5b can be operated. By operating of the right-side travel operation member 33R, the right-side hydraulic motor 5c can be driven and the right-side caterpillar band 5a can be operated.

The travel operation detection units 34L and 34R generate pilot pressure according to inputs to the travel operation members 33L and 33R, that is, operation content, and supply the generated pilot pressure to the travel control valve included in the hydraulic control valve 38. The travel control valve is operated in accordance with the magnitude of the pilot pressure, so that the working oil is supplied to the travel hydraulic motor 5c. When the travel operation members 33L and 33R are electric system levers, the travel operation detection units 34L and 34R detect the inputs to the travel operation members 33L and 33R, that is, the operation content, using a potentiometer, or the like, convert the inputs to electrical signals (detection signals), and send the signals to the working machine control device 25. The working machine control device 25 controls the travel control valve based on the detection signals.

The engine control device 26 controls an output of the engine 36 by adjusting an amount of fuel to be supplied to the engine 36. The engine 36 drives the hydraulic pump 37 mechanically coupled with an output shaft. The hydraulic pump 37 coupled with the engine 36 supplies the working oil to the oil pressure devices, such as the boom cylinder 10, the arm cylinder 11, and the bucket cylinder 12 included in the excavator 100. A rotation speed detection sensor 36R and a fuel adjustment dial 26D are electrically connected with the engine control device 26. The engine control device 26 controls the amount of fuel to be supplied to the engine 36 based on a rotation speed of a crank shaft of the engine 36 detected by the rotation speed detection sensor 36R, setting of the fuel adjustment dial 26D, and the like. In this way, the engine control device 26 controls the output of the engine 36.

The pump control device 27 controls the hydraulic pump 37 included in the excavator 100. The hydraulic pump 37 is a swash plate type hydraulic pump that changes a discharge amount of the working oil and the like by changing a tilt angle of a swash plate. The pump control device 27 acquires the pilot pressure detected by an oil pressure sensor 38C of the hydraulic control valve 38 from the working machine control device 25 through the in-vehicle signal line 41. The pump control device 27 controls the flow rate of the working oil discharged from the hydraulic pump 37 by controlling the tilt angle of the swash plate of the hydraulic pump 37 based on the acquired pilot pressure. The working oil discharged from the hydraulic pump 37 is supplied to and drives at least one of the boom cylinder 10, the arm cylinder 11, the bucket cylinder 12, the hydraulic motor 5c, and the swing motor for allowing the upper swing body 3 to swing through the work control valve or the travel control valve included in the hydraulic control valve 38.

The first display device 28 is a device that displays an image. The first display device 28 includes a display unit 28M and a control unit 28C. The first display device 28 is installed inside the operator cab 4 of the excavator 100 illustrated in FIG. 1, and in the vicinity of the operator's seat. In the present embodiment, the first display device 28 displays operating information of the excavator 100 in the display unit 28M, for example. The operating information is, for example, an accumulated operating time of the excavator 100, a residual amount of the fuel, a cooling water temperature of the engine 36, or the like. When the excavator 100 includes a peripheral monitoring camera, a back monitor camera, or the like, the first display device 28 may display an image imaged by the camera.

In the present embodiment, the first display device 28 also functions as an input device, in addition to the display device that displays various images in the display unit 28M. Therefore, the first display device 28 includes an input device 28I below the display unit 28M. In the present embodiment, the input device 28I has a plurality of press button type switches arranged parallel to a lateral direction of the display unit 28M. By operating of the input device 28I, the image displayed in the display unit 28M can be switched, and various types of setting related to the operation of the excavator 100 can be executed. Note that the first display device 28 can be configured from a touch panel in which the input device 28I is incorporated in the display unit 28M. Alternatively, the input device 28I may be installed in a console in the vicinity of the operator's seat as a separating body from the first display device 28.

The second display device 39 is a device that displays an image. The second display device 39 includes a display unit 39M and a control unit 39C. The second display device 39 is installed in the vicinity of the operator's seat inside the operator cab 4 of the excavator 100 illustrated in FIG. 1. In the present embodiment, the second display device 39 displays the position information of the edges of a blade 8T of the bucket 8 included in the excavator 100 with respect to the geographical features of a construction site in the display unit 28M as an image. At this time, the second display device 39 may display information related to the geographical features of the construction site to be dug with the edges of a blade 8T together with the position information of the edges of a blade 8T.

In the present embodiment, the display unit 39M of the second display device 39 is, but not limited to, a liquid crystal display device. The control unit 39C controls the operation of the display unit 39M, and obtains the position information of the edges of a blade 8T. Further, the control unit 39C displays a guidance image that indicates a relative positional relationship between the position of the edges of a blade 8T and the geographical features of the construction site in the display unit 39M. Therefore, the control unit 39C stores global coordinate position information about the geographical features of the construction site.

In the present embodiment, the second display device 39 includes an input device 39I below the display unit 39M. In the present embodiment, the input device 39I has a plurality of press button type switches arranged parallel to a lateral direction of the display unit 39M. By operating of the input device 39I, the guidance image displayed in the display unit 39M can be switched, and the content of guidance can be changed. In the present embodiment, the function of the second display device 39 may be realized by the first display device 28. The second display device 39 may be configured from a touch panel in which the input device 39I is incorporated in the display unit 39M. Alternatively, a display device formed such that the first display device 28 and the second display device 39 are housed in a single housing may be used.

The IMU 29 detects the angle speed and the acceleration of the excavator 100. With the operation of the excavator 100, various types of acceleration, such as acceleration generated at the time of traveling, angular acceleration generated at the time of swinging, and gravity acceleration, are caused. However, the IMU 29 detects at least acceleration including the gravity acceleration, and outputs the detected acceleration without distinguishing types of the acceleration. While details of the IMU 29 will be described below, it is desirable that the IMU 29 is provided on a swing central axis of the upper swing body 3 of the excavator 100 in order to detect the acceleration with high accuracy, the IMU 29 may be installed at a lower portion of the operator cab 4.

The IMU 29 detects acceleration in an X-axis direction, a Y-axis direction, and a Z-axis direction, and an angle speed (rotation angle speed) around the X-axis, the Y-axis, and the Z-axis in a coordinate system (X, Y, Z) illustrated in FIG. 1. In the example of FIG. 1, the X-axis is an axis parallel to the front and back direction of the excavator 100, the Y-axis is an axis parallel to the width direction of the excavator 100, and the Z-axis is an axis perpendicular to both of the X-axis and the Y-axis. The coordinate system (X, Y, Z) can be a vehicle body coordinate system.

Figure 3:
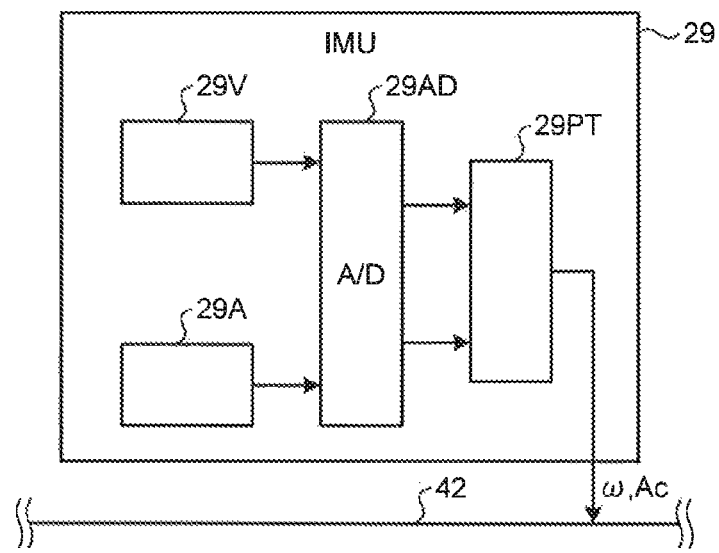
FIG. 3 is a block diagram illustrating an example of an IMU.

FIG. 3 is a block diagram illustrating an example of the IMU 29. The IMU 29 includes a gyro 29V, an acceleration sensor 29A, an AD conversion unit 29AD, and a physical amount conversion unit 29PT. The gyro 29V detects the angle speed of the excavator 100. The acceleration sensor 29A detects the acceleration of the excavator. Both of the angle speed detected by the gyro 29V and the acceleration detected by the acceleration sensor 29A are analog amounts. The AD conversion unit 29AD converts these analog amounts into digital amounts. The physical amount conversion unit 29PT converts an output of the AD conversion unit 29AD into a physical amount. To be specific, the physical amount conversion unit 29PT converts an output of the AD conversion unit 29AD corresponding to a detection value of the gyro 29V into an angle speed $\omega$, and converts an output of the AD conversion unit 29AD corresponding to a detection value of the acceleration sensor 29A into acceleration Ac. The physical amount conversion unit 29PT outputs the angle speed $\omega$ and the acceleration Ac to the in-vehicle signal line 42.

The inclination of the excavator 100 can be expressed by a pitch angle, a roll angle, and a yaw angle. The pitch angle is an angle of when the excavator 100 is tilted around the Y-axis, the roll angle is an angle of when the excavator 100 is tilted around the X-axis, and the yaw angle is an angle of when the excavator 100 is tilted around the Z-axis. In the present embodiment, the pitch angle and the roll angle are referred to as posture angles of the excavator 100. In the present embodiment, the sensor control device 24 acquires the angle speed and the acceleration of the excavator 100 detected by the IMU 29 through the in-vehicle signal line 42. The sensor control device 24 obtains the posture angle from the acquired angle speed and acceleration of the excavator 100. Hereinafter, the posture angle is appropriately expressed using a sign $\theta$.

Figure 4:
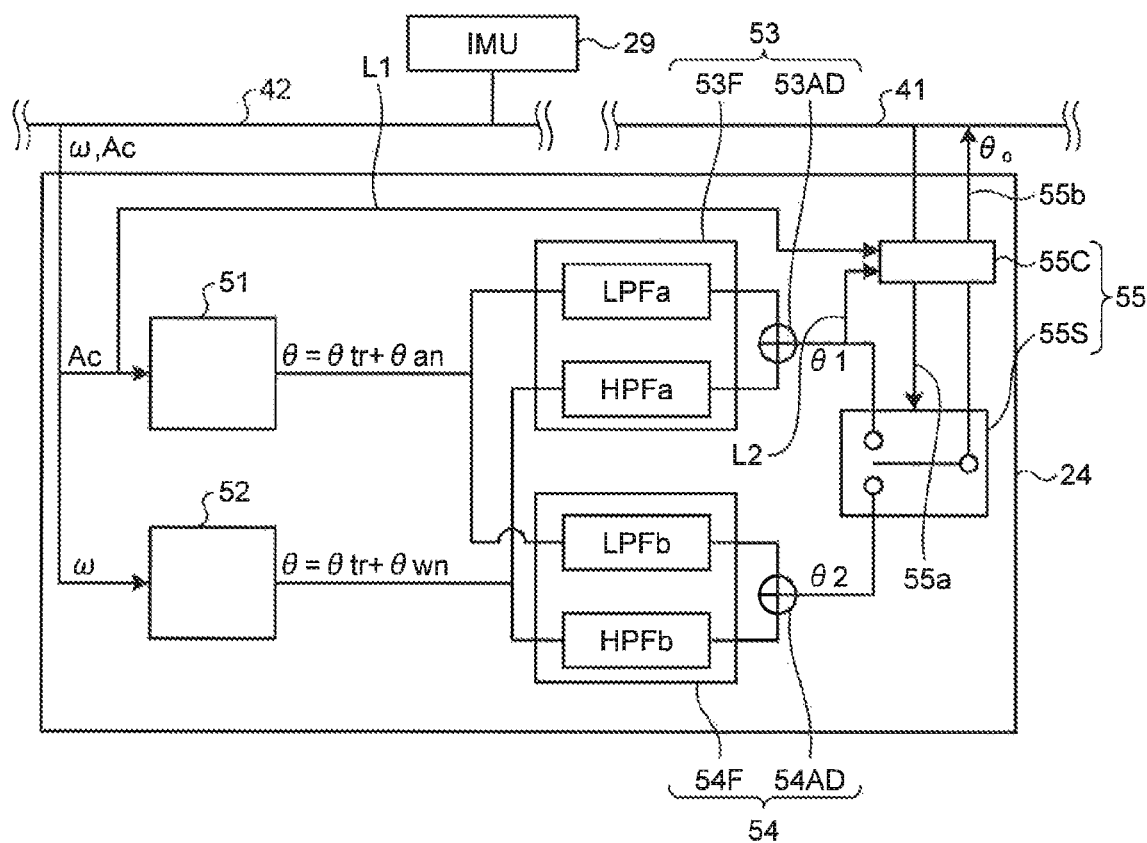
FIG. 4 is a block diagram illustrating a sensor control device.

FIG. 4 is a block diagram illustrating the sensor control device 24. The sensor control device 24 includes a first posture angle calculation unit 51 as a posture angle calculation unit, a second posture angle calculation unit 52 as a posture angle calculation unit similarly to the first posture angle calculation unit 51, a first complementary filter 53, a second complementary filter 54, and a switching unit 55. The first posture angle calculation unit 51 and the second posture angle calculation unit 52 obtain posture angles $\theta$ of the excavator 100 from the angle speed $\omega$ and the acceleration Ac of the excavator 100. In the present embodiment, the first posture angle calculation unit 51 obtains the posture angle $\theta$ from the acceleration Ac of the excavator 100 detected by the IMU 29. To be specific, the first posture angle calculation unit 51 obtains the posture angle $\theta$ from a direction of the gravity acceleration. The second posture angle calculation unit 52 obtains the posture angle $\theta$ from the angle speed $\omega$ of the excavator 100 detected by the IMU 29. To be specific, the second posture angle calculation unit 52 integrates the angle speed $\omega$ to obtain the posture angle $\theta$.

A first cutoff frequency is set to the first complementary filter 53, and the first complementary filter 53 decreases noises included in the posture angles $\theta$ obtained by the first posture angle calculation unit 51 and the second posture angle calculation unit 52, and outputs a first posture angle $\theta1$. A second cutoff frequency different from the first cutoff frequency is set to the second complementary filter 54, and the second complementary filter 54 decreases noises included in the posture angles θ obtained by the first posture angle calculation unit 51 and the second posture angle calculation unit 52, and outputs a second posture angle θ2. The first complementary filter 53 and the second complementary filter 54 are different only in the cutoff frequencies.

The first complementary filter 53 includes a filter unit 53F and an adding unit 53AD. The filter unit 53F includes a first low pass filter (LPF)a and a first high pass filter (HPF)a. The adding unit 53AD adds outputs of the first LPFa and the first HPFa, and outputs an output. The output of the adding unit 53AD is an output of the first complementary filter 53. The output of the first complementary filter 53 is appropriately referred to as first posture angle θ1.

The second complementary filter 54 includes a filter unit 54F and an adding unit 54AD. The filter unit 54F includes a second low pass filter (LPF)b and a second high pass filter (HPF)b. The adding unit 54AD adds an output of the second LPFb and an output of the second HPFb, and outputs an output. The output of the adding unit 54AD is an output of the second complementary filter 54. The output of the second complementary filter 54 is referred to as second posture angle θ2.

The switching unit 55 includes a processing unit 55C and a switcher 55S. The switching unit 55 switches between the first posture angle θ1 and the second posture angle θ2 to output the first posture angle θ1 or the second posture angle θ2 according to the operation state of the excavator 100. Next, the output will be described. The processing unit 55C of the switching unit 55 determines which of the first posture angle θ1 and the second posture angle θ2 is to be output according to the state of the excavator 100, for example, whether the excavator 100 is moving or stands still. A determination result of the processing unit 55C is output to the switcher 55S through a determination result output line 55a, and the switcher 55S outputs either the first posture angle θ1 or the second posture angle θ2 to the in-vehicle signal line 41 through a posture angle output line 55b as a posture angle θo of the excavator 100 obtained by the sensor control device 24 according to the determination result of the processing unit 55C.

Figure 5:
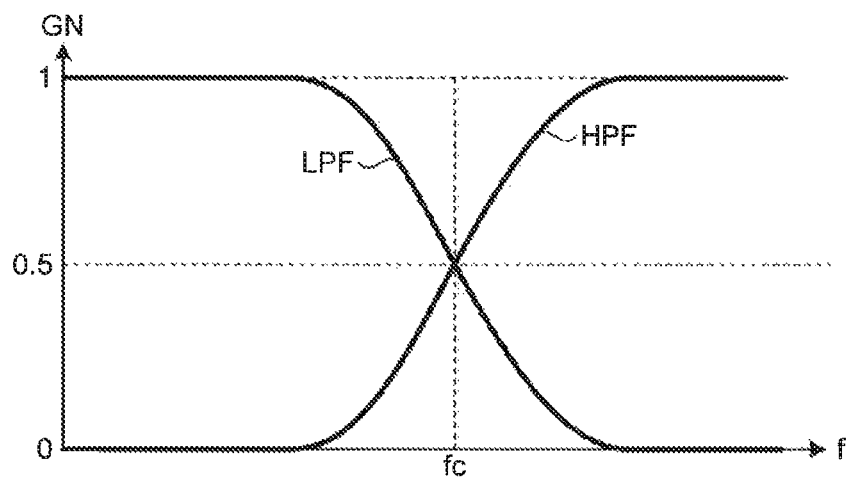
FIG. 5 is a diagram illustrating characteristics of a complementary filter.

FIG. 5 is a diagram illustrating characteristics of a complementary filter. The vertical axis of FIG. 5 is a gain GN, and the horizontal axis is a frequency f. The curves (LPF and HPF) of FIG. 5 indicate frequency characteristics of a complementary filter. The complementary filter includes a low pass filter (LPF) and a high pass filter (HPF), and is a filter in which a sum of the gain GN of the LPF and the gain GN of the HPF becomes 1, as can be seen from FIG. 5. For example, when the posture angle θ is input to the complementary filter, a sum of an output LPF (θ) of the LPF and an output HPF (θ) of the HPF becomes 1. That is, LPF (θ)+HPF (θ)=θ. A frequency of when both of the gain GN of the LPF and the gain GN of the HPF become 0.5 is called cutoff frequency fc. The first complementary filter 53 and the second complementary filter 54 included in the sensor control device 24 are different only in the cutoff frequency fc, as described above.

The posture angle θ obtained by the first posture angle calculation unit 51 illustrated in FIG. 4 from the direction of the gravity acceleration is obtained from a sum of a true posture angle θtr and an error θan. The error θan is caused by acceleration other than the gravity acceleration, such as shock acceleration. The error θan is a noise mainly including a high-frequency component. The posture angle θ obtained by the second posture angle calculation unit 52 illustrated in FIG. 4 by performing of integration of the angle speed ω is obtained from a sum of the true posture angle θtr and an error θwn. The error θwn is caused by accumulated drift due to the integration. The error θwn is a noise mainly including a low-frequency component.

As described above, the posture angle θ obtained by the first posture angle calculation unit 51 from the direction of the gravity acceleration includes the error θan mainly including a high-frequency component, and is thus input to the first LPFa of the first complementary filter 53 and the second LPFb of the second complementary filter 54. The posture angle θ obtained by the second posture angle calculation unit 52 by integration of the angle speed ω includes the error θwn mainly including a low-frequency component, and is thus input to the first HPFa of the first complementary filter 53 and the second HPFb of the second complementary filter 54.

The output of the first LPFa becomes LPFa (θtr+θan), and the output of the first HPFa becomes HPFa (θtr+θwn). The output of the second LPFb becomes LPFb (θtr+θan), and the output of the second HPFb becomes HPFb (θtr+θwn). When all of the LPFa (θtr+θan), the HPFa (θtr+θwn), the LPFb (θtr+θan), and the HPFb (θtr+θwn) have linearity, the formulas (1) to (4) are established.

$$\text{LPF}a(\theta tr+\theta an)=\text{LPF}a(\theta tr)+\text{LPF}a(\theta an) \quad (1)$$

$$\text{HPF}a(\theta tr+\theta wn)=\text{HPF}a(\theta tr)+\text{HPF}a(\theta wn) \quad (2)$$

$$\text{LPF}b(\theta tr+\theta an)=\text{LPF}b(\theta tr)+\text{LPF}b(\theta an) \quad (3)$$

$$\text{HPF}b(\theta tr+\theta wn)=\text{HPF}b(\theta tr)+\text{HPF}b(\theta wn) \quad (4)$$

From the characteristics of the complementary filter described above, LPFa(θ)+HPFa(θ)=θ and LPFb(θ)+HPFb(θ)=θ are established. In the first complementary filter 53, outputs of the filter unit 53F, that is, the output of the first LPFa and the output of the first HPFa are added by the adding unit 53AD. The output of the adding unit 53AD, that is, the first posture angle θ1 becomes θtr+LPFa(θan)+HPFa(θwn). In the second complementary filter 54, outputs of the filter unit 54F, that is, the output of the second LPFb and the output of the second HPFb are added by the adding unit 54AD. The output of the adding unit 54AD, that is, the second posture angle θ2 becomes θtr+LPFb(θan)+HPFb(θwn).

Since the error θan mainly includes a high-frequency component, the error θan is decreased by the first LPFa and the second LPFb. Therefore, values of the LPFa (θan) and the LPFb (θan) become small. Since the error θwn mainly includes a low-frequency component, the error θwn is decreased by the first HPFa and the second HPFb. Therefore, values of the LPFa (θan) and the HPFa (θwn) and values of the LPFb (θan) and the HPFb (θwn) become small, and the first posture angle θ1 that is the output of the adding unit 53AD and the second posture angle θ2 that is the output of the adding unit 54AD become values close to the true posture angle θtr.

Figure 6:
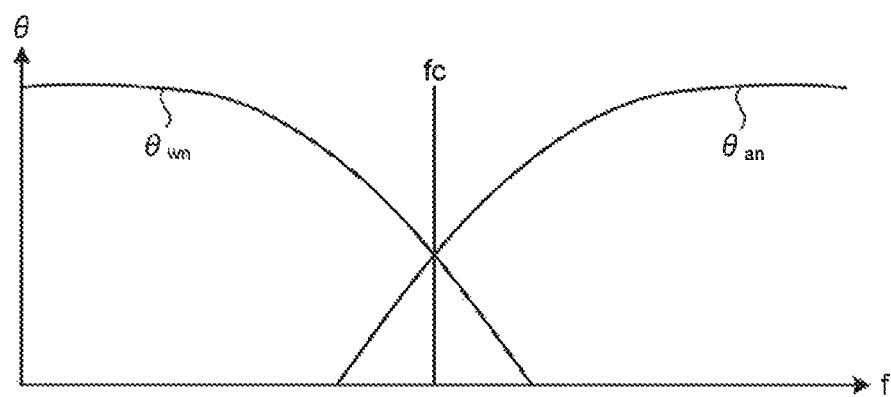
FIG. 6 is a diagram illustrating frequency characteristics of errors.

FIG. 6 is a diagram illustrating frequency characteristics of the error θan and the error θwn. The vertical axis of FIG. 6 is a spectrum of the error θan and error θwn, and the horizontal axis is a frequency f. If a high-performance IMU 29 can be used, the accuracy of the angle speed ω and the acceleration Ac detected by the IMU 29 is high. Therefore, the error θan of the posture angle θ obtained by the first posture angle calculation unit 51 included in the sensor control device 24 illustrated in FIG. 4 and the error θwn of the posture angle θ obtained by the second posture angle calculation unit 52 become small. When the performance of the IMU 29 is low, the accuracy of the angle speed ω and the acceleration Ac detected by the IMU 29 is low. Therefore, the error θan of the posture angle θ obtained by the first posture angle calculation unit 51 included in the sensor control device 24 illustrated in FIG. 4 and the error θwn of the posture angle θ obtained by the second posture angle calculation unit 52 become large. As a result, as illustrated in FIG. 6, the error θwn and the error θan exist even after exceeding the cutoff frequency fc of the complementary filter, respectively, and overlap with each other within a range of a predetermined frequency f including the cutoff frequency fc. The error θwn exists even in a frequency larger than the cutoff frequency fc, and the error θan exists even in a frequency smaller than the cutoff frequency fc.

Therefore, when the performance of the IMU 29 is low, one complementary filter cannot sufficiently remove the error θwn and the error θan that are noises, and may incur a decrease in the accuracy of the posture angle θ. This may influence the display accuracy of the position information of the edges of a blade 8T by the second display device 39 and the accuracy of control of the working machine of the excavator 100. The price of a high-performance IMU 29 is high, and thus an increase in manufacturing cost of the excavator 100 is caused. That is, it is necessary to consider the characteristics illustrated in FIG. 6 to apply a low-performance IMU 29 to the excavator 100. Therefore, the sensor control device 24 uses the first complementary filter 53 and the second complementary filter 54 having different cutoff frequencies fc so that the decrease in the accuracy of the posture angle θ can be suppressed even if a relatively low-performance IMU 29 is used.

Figure 7:
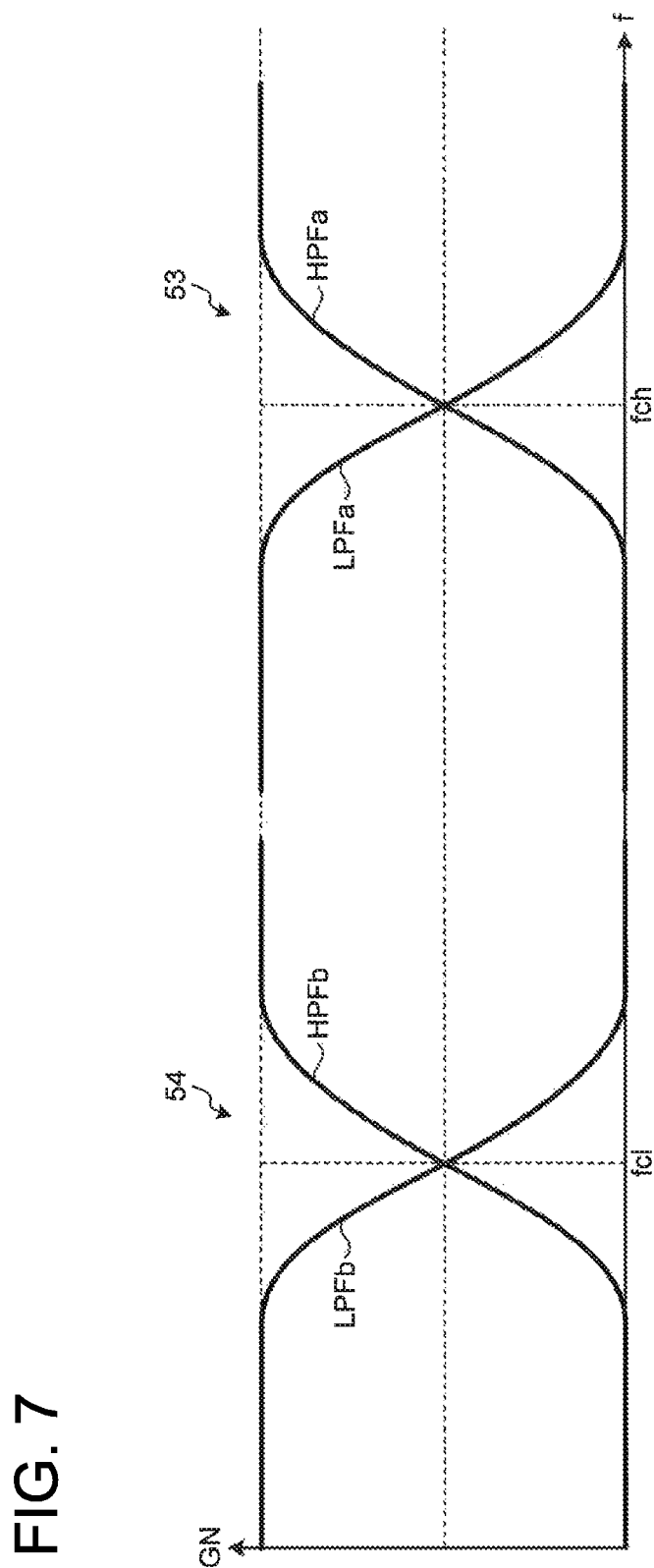
FIG. 7 is a diagram illustrating a relationship between gains of a first complementary filter and a second complementary filter, and a frequency.

FIG. 7 is a diagram illustrating a relationship between a gain GN of the first complementary filter 53 and a gain GN of the second complementary filter 54, and a frequency f. The vertical axis of FIG. 7 is the gain GN, and the horizontal axis is the frequency f. A frequency fch is the first cutoff frequency of the first complementary filter 53, and a frequency fcl is the second cutoff frequency of the second complementary filter 54. In the present embodiment, the first cutoff frequency fch is higher than the second cutoff frequency fcl. That is, the second cutoff frequency fcl is lower than the first cutoff frequency fch.

The first cutoff frequency fch of the first complementary filter 53 is set to a frequency that can sufficiently decrease an integration error of the angle speed ω, that is, the error θwn. The second cutoff frequency fcl of the second complementary filter 54 is set to a frequency that can sufficiently decrease the error θan due to acceleration other than the gravity acceleration.

The first complementary filter 53 can effectively decrease the error θwn due to the integration of the angle speed ω by the first HPFa. However, it is difficult to effectively decrease the error θan caused by the acceleration other than the gravity acceleration. Therefore, the first complementary filter 53 can accurately obtain the posture angle θ when the excavator 100 is in a stationary state, or in a state close to the stationary state, that is, when the excavator 100 is deemed to be in a stationary state (appropriately, referred to as quasi-stationary state). However, the accuracy of the posture angle θ is decreased when the excavator 100 is in a dynamic state, which is not the quasi-stationary state. In the present embodiment, the dynamic state is a state in which the excavator 100 is deemed to be moving.

The second complementary filter 54 can effectively decrease the error θan due to acceleration other than the gravity acceleration by the second LPFa. However, it is difficult to effectively decrease the error θwn due to the integration of the angle speed ω. Therefore, when the excavator 100 is in the dynamic state, the second complementary filter 54 can accurately obtain the posture angle θ. However, when the excavator 100 is in the quasi-stationary state, the accuracy of the posture angle θ is decreased compared with the posture angle θ calculated by the first complementary filter 53. That is, while the second complementary filter 54 is excellent in dynamic characteristics in a short time, the second complementary filter 54 has the error θwn due to the integration of the angle speed ω in the quasi-stationary state, similarly to the dynamic state.

The switching unit 55 included in the sensor control device 24 illustrated in FIG. 4 switches between the first posture angle θ1 and the second posture angle θ2 to output the first posture angle θ1 or the second posture angle θ2 according to whether the operation state of the excavator 100 is in the quasi-stationary state or in the dynamic state. For example, when the excavator 100 is in the quasi-stationary state, the switching unit 55 outputs the first posture angle θ1 output by the first complementary filter 53 to the in-vehicle signal line 41 as the posture angle θo of the excavator 100. When the excavator 100 is in the dynamic state, the switching unit 55 outputs the second posture angle θ2 output by the second complementary filter 54 to the in-vehicle signal line 41 as the posture angle θo of the excavator 100.

As described above, when the excavator 100 is in the quasi-stationary state, the sensor control device 24 uses the first posture angle θ1 of the first complementary filter 53 as the posture angle θo of the excavator 100, and thus the decrease in the accuracy of the posture angle θo can be suppressed in the quasi-stationary stat. When the excavator 100 is in the dynamic state, the sensor control device 24 uses the second posture angle θ2 of the second complementary filter 54 as the posture angle θo of the excavator 100, and thus even in the dynamic state, the decrease in the accuracy of the posture angle θo can be decreased. As a result, the sensor control device 24 can suppress the decrease in the accuracy of the posture angle θo of the excavator 100 even when the excavator 100 is either in the quasi-stationary state or in the dynamic state.

When the excavator 100 is moving, the second posture angle θ2 output by the second complementary filter 54 is used, and the position of the edges of a blade 8T of the bucket 8 illustrated in FIG. 1 is obtained, for example. Further, when the excavator 100 stands still, the position of the edges of a blade 8T of the bucket 8 is obtained with the first posture angle θ1 output by the first complementary filter 53. Therefore, the decrease in the accuracy of when the second display device 39 illustrated in FIG. 2 obtains the position of the working machine 2 represented by the position of the edges of a blade 8T of the bucket 8, the position of the vehicle body 1 of the excavator 100, or the like can be suppressed.

The processing unit 55C of the switching unit 55 determines the quasi-stationary state and the dynamic state using the following conditions A and B, for example, and controls the switcher 55S based on a determination result.

Condition A: A standard deviation of the first posture angle θ1 is smaller than a threshold set in advance in a predetermined period before a timing at which determination of switching is made.

Condition B: The magnitude of the acceleration other than the gravity acceleration is smaller than a threshold set in advance.

The first posture angle θ1 is obtained from the angle speed co or the acceleration Ac detected by the IMU 29, and the acceleration including the gravity acceleration is detected by the IMU 29. That is, the processing unit 55C determines the quasi-stationary state and the dynamic state based on a state of the IMU 29 included in the excavator 100.

The condition B will be described. As described above, the IMU 29 detects the acceleration including at least the gravity acceleration, and outputs the detected acceleration without distinguishing a type of each of the detected acceleration. The gravity acceleration is already known. Therefore, the processing unit 55C calculates the acceleration in the X-axis direction or in the Y-axis direction from the acceleration output from the IMU 29. The processing unit 55C subtracts gravity acceleration corresponding to the X-axis direction of the gravity acceleration from the obtained acceleration in the X-axis direction, thereby obtaining the magnitude of the acceleration other than the gravity acceleration. The processing unit 55C compares the magnitude of the acceleration other than the gravity acceleration and the threshold set in advance. Note that the processing unit 55C may obtain the magnitude of the acceleration other than the gravity acceleration by subtracting gravity acceleration corresponding to the Y-axis direction of the gravity acceleration from obtained acceleration in the Y-axis direction, compare the obtained magnitude and the threshold set in advance, and determine whether the condition B is established.

The processing unit 55C acquires the acceleration Ac acquired from the IMU 29 and the first posture angle $\theta 1$ that is the output of the first complementary filter 53 through an acceleration transmission line L1 or a first posture angle transmission line L2 illustrated in FIG. 4, and determines whether the conditions A and B are established at the same time. When both of the conditions A and B are established, the excavator 100 can be considered in the quasi-stationary state. In the present embodiment, the quasi-stationary state is a state in which the excavator 100 does not perform any of traveling, swinging of the upper swing body 3, and the operation of the working machine 2, and fully stands still, or a state in which the traveling and the swinging of the upper swing body 3 of the excavator 100 are not performed, and only the working machine 2 is operated. In these cases, the processing unit 55C operates the switcher 55S so that the switcher 55S is connected with the adding unit 53AD of the first complementary filter 53. The switcher 55S outputs the first posture angle $\theta 1$ output by the first complementary filter 53 to the in-vehicle signal line 41 as the posture angle $\theta o$ of the excavator 100.

When the conditions A and B are not established, that is, when at least one of the conditions A and B is not established, the excavator 100 can be considered in the dynamic state, that is, the excavator 100 can be considered moving. In this case, the processing unit 55C operates the switcher 55S so that the switcher 55S is connected with the adding unit 54AD of the second complementary filter 54. The switcher 55S outputs the second posture angle $\theta 2$ output by the second complementary filter 54 to the in-vehicle signal line 41 as the posture angle $\theta o$ of the excavator 100. If the switching unit 55 switches between the first posture angle $\theta 1$ and the second posture angle $\theta 2$ using the conditions A and B, the above-described switching can be realized only by the detection value of the IMU 29.

In the present embodiment, the predetermined period of the condition A is set, but not limited to, one second. While the threshold compared with the standard deviation of the condition A is not limited, the threshold can be 0.1 degrees, for example. The condition B is established when the acceleration other than the gravity acceleration is smaller than the threshold set in advance, and is not established when the acceleration other than the gravity acceleration equal to or more than the threshold set in advance is detected. While the threshold of the condition B is not limited, the threshold can be appropriately set within a range of 0.1 times or more of the gravity acceleration, for example.

(Modification of Determining Whether a Quasi-Stationary State or a Dynamic State)

In the present embodiment, the processing unit 55C of the switching unit 55 illustrated in FIG. 4 switches between the first posture angle $\theta 1$ and the second posture angle $\theta 2$ to output the first posture angle $\theta 1$ or the second posture angle $\theta 2$ as the posture angle $\theta o$ of the excavator 100 based on the detection value of the IMU 29 illustrated in FIG. 2. Selection of a first posture angle $\theta 1$ or a second posture angle $\theta 2$ is not limited to the above method. A processing unit 55C may switch between the first posture angle $\theta 1$ and the second posture angle $\theta 2$ using information related to an operation of an excavator 100 (hereinafter, appropriately referred to as operation information), for example.

In the present embodiment, the operation information is information related to occurrence of some operation in the excavator 100. For example, examples of the operation information include information of whether an upper swing body 3 illustrated in FIG. 1 swings, information of whether a traveling device 5 is operated, and information of whether a working machine 2 is operated. As the operation information, a detection value output from a sensor that detects swinging of the upper swing body 3, a detection value output from an angle detector or a rotation sensor, such as a swing angle sensor including a resolver provided in a swing motor for allowing the upper swing body 3 to swing, a detection value output from an oil pressure sensor that detects pilot pressure generated by working machine operation detection units 32L and 32R illustrated in FIG. 2, and the like are used. That is, the operation information may be information of whether the upper swing body 3, the working machine 2, or the like is actually operated, or may be information of an operation of an operation member for operating the upper swing body 3, the working machine 2, or the like.

Figure 8:
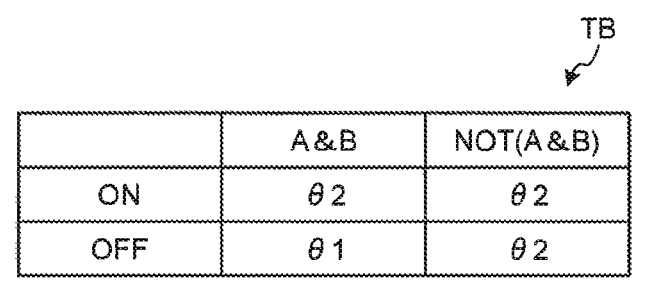

FIG. 8 is a diagram illustrating an example of a table TB used for switching between the first posture angle $\theta 1$ and the second posture angle $\theta 2$ in the modification of the present embodiment. In the present modification, the processing unit 55C of a switching unit 55 switches between the first posture angle $\theta 1$ and the second posture angle $\theta 2$ based on determination of whether the quasi-stationary or the dynamic state based on a detection value of an IMU 29, and determination of whether the upper swing body 3 is swinging. In the table TB, a posture angle to be output as a posture angle $\theta o$ of the excavator 100 is written with respect to the state of the upper swing body 3 and conditions A and B based on a detection value of an IMU 29. The state of the upper swing body 3 is expressed by ON or OFF, and ON indicates the upper swing body 3 is swinging, and OFF indicates the upper swing body 3 is being stopped. The conditions A and B are expressed by A&B or NOT (A&B), and A&B indicates the quasi-stationary state, and NOT (A&B) indicates the dynamic state.

Assume that a determination result based on the detection value of the IMU 29 is the quasi-stationary state, and the upper swing body 3 is swinging (ON) from the operation information. In this case, the switching unit 55 outputs the second posture angle $\theta 2$ as the posture angle $\theta o$ of the excavator 100. Since the upper swing body 3 is actually moving, the accuracy of the posture angle $\theta o$ can be secured by using of the second posture angle $\theta 2$ as the posture angle $\theta o$ of the excavator 100.

Assume that the determination result of the detection value of the IMU 29 is the quasi-stationary state, and the upper swing body 3 is being stopped (OFF) from the operation information. In this case, the switching unit 55 outputs the first posture angle θ1 as the posture angle θo of the excavator 100. Since the excavator 100 is in the quasi-stationary state, and the upper swing body 3 is actually being stopped, an error due to integration of an angle speed ω can be decreased by using of the first posture angle θ1 as the posture angle θo of the excavator 100.

Assume that the determination result based on the detection value of the IMU 29 is the dynamic state, and the upper swing body 3 is swinging (ON) from the operation information. In this case, the switching unit 55 outputs the second posture angle θ2 as the posture angle θo of the excavator 100. Since the excavator 100 is in the dynamic state, and the upper swing body 3 is actually moving, the accuracy of the posture angle θo can be secured by using of the second posture angle θ2 as the posture angle θo of the excavator 100.

Assume that the determination result based on the detection value of the IMU 29 is the dynamic state, and the upper swing body 3 is being stopped (OFF) from the operation information. In this case, the switching unit 55 may output either the first posture angle θ1 or the second posture angle θ2 as the posture angle θo of the excavator 100. In this modification, the switching unit 55 outputs the second posture angle θ2.

In the present modification, the switching unit 55 switches between the first posture angle θ1 and the second posture angle θ2 based on the determination of whether the quasi-stationary state or the dynamic state based on the detection value of the IMU 29, and the determination of whether the upper swing body 3 is swinging. By doing so, the switching unit 55 can more accurately determines the state of the excavator 100, and can select an appropriate posture angle. The present modification is not limited to the above processing, and the switching unit 55 may switch between the first posture angle θ1 and the second posture angle θ2 based on the determination of whether the upper swing body 3 is swinging without using the determination result based on the detection value of the IMU 29. For example, when the upper swing body 3 is swinging, the second posture angle θ2 may be used as the posture angle θo of the excavator 100, and when the upper swing body 3 is being stopped, the first posture angle θ1 may be the posture angle θo of the excavator 100.

Figure 9:
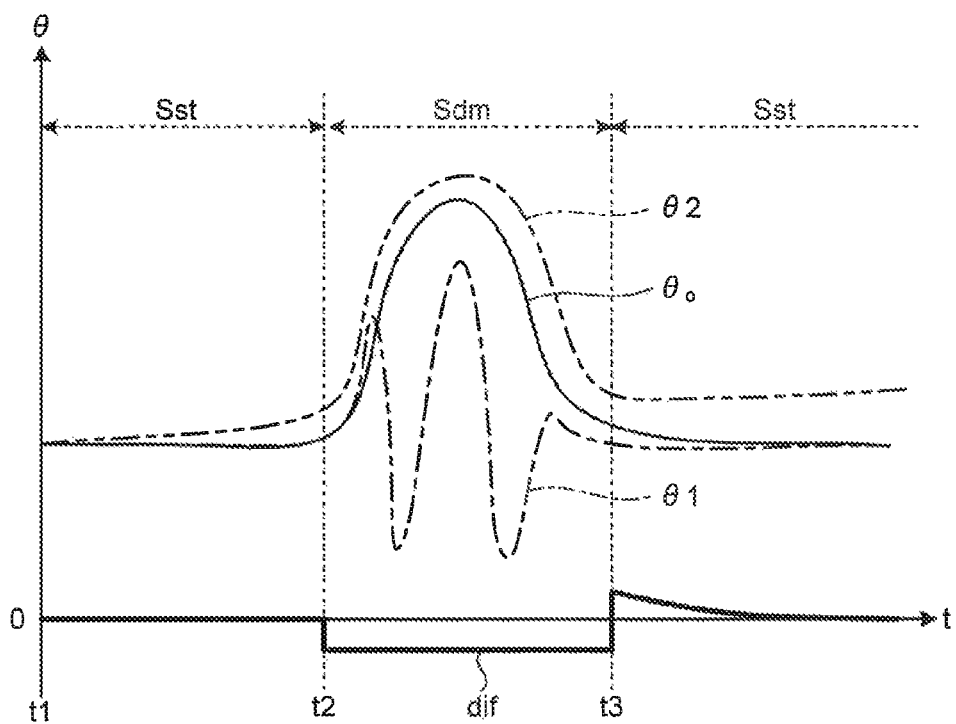
FIG. 9 is a diagram illustrating an example of temporal change of a posture angle, a first posture angle, and a second posture angle of an excavator output by a switching unit of the sensor control device.

FIG. 9 is a diagram illustrating an example of temporal change of the posture angle θo, the first posture angle θ1, and the second posture angle θ2 of the excavator 100 output by the switching unit 55 of the sensor control device 24. The thick solid line illustrated in FIG. 9 indicates an example of temporal change of a relaxation term dif described below. The vertical axis of the FIG. 9 is the posture angle θ, and the horizontal axis is a time t. The section illustrated by Sst of FIG. 9 is the quasi-stationary state, and the first posture angle θ1 is output as the posture angle θo of the excavator 100. The section illustrated by Sdm of FIG. 9 is the dynamic state, and the second posture angle θ2 is output as the posture angle θo of the excavator 100. In the example of FIG. 9, the state from a time t1 to a time t2, and on and after a term t3 are the quasi-stationary state Sst, and the state from the time t2 to the time t3 is the dynamic state Sdm.

The posture angle θo of the excavator 100 is switched from the first posture angle θ1 to the second posture angle θ2 at the time t2, and is switched from the second posture angle θ2 to the first posture angle θ1 at the time t3. The second posture angle θ2 has accumulation of the error θwn due to integration of the angle speed ω, and thus the first posture angle θ1 and the second posture angle θ2 have different values at the time t2. Similarly, at time t3, the second posture angle θ2 and the first posture angle θ1 have different values.

When the switching unit 55 switches from the posture angle θo output from the sensor control device 24 from the first posture angle θ1 to the second posture angle θ2, or from the second posture angle θ2 to the first posture angle θ1, the posture angle θo of the excavator 100 may become discontinuous at the time of switching if the angle is changed as is. Further, as described above, the second posture angle θ2 has accumulation of the error θwn due to integration of the angle speed ω. Therefore, when the second posture angle θ2 is used as the posture angle θo of the excavator 100, the error θwn due to the integration needs to be decreased.

To decrease the discontinuity of the posture angle θo generated at the time of switching of the posture angle θo and the error θwn due to the integration, in the present embodiment, the processing unit 55C of the switching unit 55 obtains and outputs the posture angle θo using formulas (5) to (10).

$$\theta o = \theta 1 + dif \quad (5)$$

$$\theta o = \theta 2 + dif \quad (6)$$

$$dif = Ftr \times dif\_prev \quad (7)$$

$$dif = dif\_prev \quad (8)$$

$$dif = dif\_prev + \theta 1 - \theta 2 \quad (9)$$

$$dif = dif\_prev + \theta 2 - \theta 1 \quad (10)$$

The formula (5) is used when the posture angle θo is obtained in the quasi-stationary state, and the formula (6) is used when the posture angle θo is obtained in the dynamic state. dif in the formulas (5) and (6) is a relaxation term. The relaxation term dif of the formula (7) is used in the quasi-stationary state, and the relaxation term dif of the formula (8) is used in the dynamic state. Ftr of the formula (7) is a relaxation coefficient. The relaxation coefficient Ftr is larger than 0 and smaller than 1 (0<Ftr<1). The relaxation term dif of the formula (9) is used at timing when the quasi-stationary state is transferred to the dynamic state. The relaxation term dif of the formula (10) is used at a timing of when the dynamic state is transferred to the quasi-stationary state. dif_prev in the formulas (8) to (10) is a relaxation term dif in a state of an immediately preceding IMU 29 (the quasi-stationary state Sst or the dynamic state Sdm). An initial value of dif_prev is 0.

As illustrated in FIG. 9, while keeping high accuracy in the quasi-stationary state Sst, the first posture angle θ1 has a large error in the dynamic state Sdm. The second posture angle θ2 has an error due to accumulation of integration in both of the quasi-stationary state Sst and the dynamic state Sdm. Since the initial value of dif_prev is 0, the relaxation term dif=0 in the quasi-stationary state Sst from the time t1 to the time t2. As a result, the posture angle θo of the excavator 100 in the quasi-stationary state Sst becomes the first posture angle θ1 from the formula (5).

When the quasi-stationary state Sst is switched to the dynamic state Sdm, that is, when the time t=t2, the processing unit 55C obtains the relaxation term dif using the formula (9). As described above, the relaxation term dif is 0 when the time t=t2, and thus the relaxation term dif becomes a value of θ1−θ2 that is a difference between the first posture angle θ1 and the second posture angle θ2. The relaxation term dif of this case is a negative value, as illustrated in FIG. 9. At the time t2, the posture angle θo by the formula (5) is θ1, and the value of θ1−θ2 is input to the relaxation term dif of the formula (6). Therefore, the posture angle θo by the formula (6) becomes also θ1. Therefore, when the quasi-stationary state Sst is switched to the dynamic state Sdm, the posture angle θo of the excavator 100 is continuously changed.

In the dynamic state Sdm from the time t2 to the time t3, the value of the θ1−θ2 of the relaxation term dif obtained at the time t2 is held as is at the time of switching. The posture angle θo of the excavator 100 in the dynamic state Sdm is obtained by the formula (6) by adding of the second posture angle θ2 in the dynamic state Sdm and the value of the relaxation term dif=θ1−θ2 obtained and held at the time t2. The relaxation term dif used at that time is dif_prev from the formula (8), and thus, as the relaxation term dif used in the dynamic state Sdm, the relaxation term dif=θ1−θ2 obtained and held at the time t2 is used. As described above, after switching from the first posture angle θ1 to the second posture angle θ2, the processing unit 55C of the switching unit 55 corrects the obtained second posture angle θ2 using the value obtained by subtracting of the second posture angle θ2 from the first posture angle θ1 at the time of switching, that is, the relaxation term dif at the time of switching, as a correction value. In doing so, influence of the error θwn due to accumulation of integration of the second posture angle θ2 caused before switching to the dynamic state Sdm on the posture angle θo of the excavator 100 can be decreased.

When the dynamic state Sdm is switched to the quasi-stationary state Sst again, that is, at the time t3, the processing unit 55C obtains the relaxation term dif using the formula (10). dif_prev of the formula (10) is the relaxation term dif that has already been obtained and held. That is, dif_prev of the formula (10) is the relaxation term dif at the time t2, that is, the value of θ1−θ2 at the time t2. The relaxation term dif at the time t3 is a value obtained by adding of the value of θ1−θ2 obtained and held at the time t2 and the value of θ2−θ1 obtained at the time t3 from the formula (10). By using of the formula (10) when the dynamic state Sdm is switched to the quasi-stationary state Sst, the posture angle θo of the excavator 100 is continuously changed.

In the quasi-stationary state Sst on and after the time t3, the processing unit 55C obtains the posture angle θo of the excavator 100 using the formula (5). The relaxation term dif of this time is determined according to the formula (7). dif_prev in the formula (7) is the relaxation term dif at a timing of which the dynamic state Sdm is switched to the quasi-stationary state Sst again, that is, at the time t3. In the quasi-stationary state Sst on and after the time t3, the value of the relaxation term dif is gradually decreased and settled to 0 due to effect of the relaxation coefficient Ftr. That is, in the quasi-stationary state Sst on and after the time t3, the posture angle θo of the excavator 100 is settled to the first posture angle θ1. As described above, the processing unit 55C of the switching unit 55 corrects the first posture angle θ1 using the value obtained by multiplying of the error of the second posture angle at the time of switching, that is, the relaxation term dif at the time of switching by the relaxation coefficient Ftr as a coefficient that is larger than 0 and smaller than 1, after switching from the second posture angle θ2 to the first posture angle θ1. In doing so, after the dynamic state Sdm is switched to the quasi-stationary state Sst, the posture angle θo of the excavator 100 is continuously changed.

(Example of Processing of Obtaining the Posture Angle θo)

Figure 10:
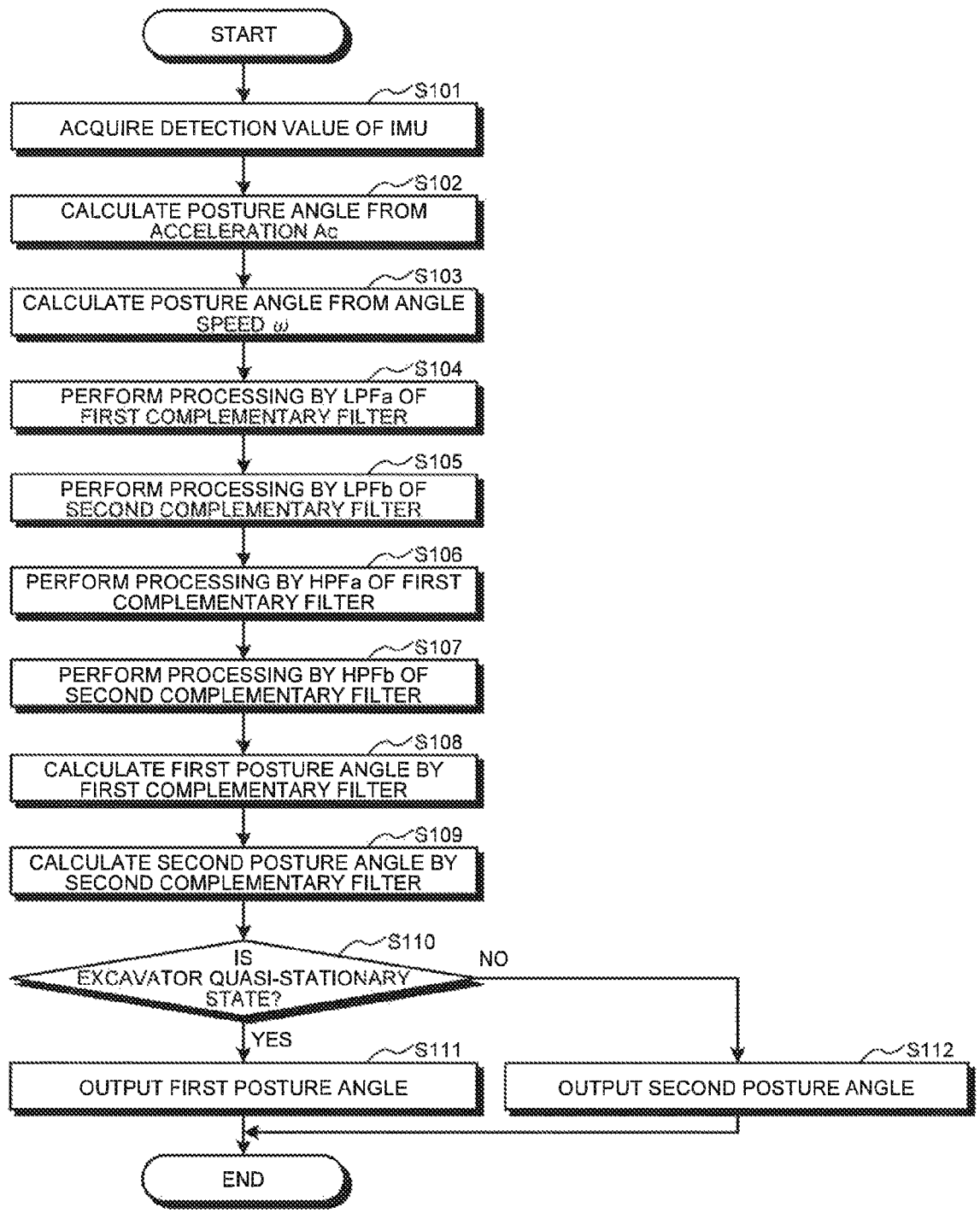
FIG. 10 is a flowchart illustrating an example of processing of obtaining a posture angle.

FIG. 10 is a flowchart illustrating an example of processing of obtaining the posture angle θo. At step S101, in obtaining the posture angle θo of the excavator 100, the sensor control device 24 illustrated in FIGS. 2 and 4 acquires the detection values of the angle speed ω and the acceleration Ac by the IMU 29 through the in-vehicle signal line 42. In step S102, the first posture angle calculation unit 51 illustrated in FIG. 2 obtains the posture angle θ from the acceleration Ac detected by the IMU 29. In step S103, the second posture angle calculation unit 52 illustrated in FIG. 2 obtains the posture angle θ from the angle speed ω detected by the IMU 29. The order of step S102 and step S103 is interchangeable.

In step S104, the first LPFa of the first complementary filter 53 illustrated in FIG. 4 applies filter processing to the posture angle θ obtained from the acceleration Ac. In step S105, the second LPFb of the second complementary filter 54 illustrated in FIG. 4 applies filter processing to the posture angle θ obtained from the acceleration Ac. In step S106, the first HPFa of the first complementary filter 53 illustrated in FIG. 4 applies filter processing to the posture angle θ obtained from the angle speed ω. In step S107, the second HPFb of the second complementary filter 54 illustrated in FIG. 4 applies filter processing to the posture angle θ obtained from the angle speed ω. The order of steps S104, S105, S106, and S107 is interchangeable.

Next, processing proceeds to step S108, and the first complementary filter 53 obtains the first posture angle θ1. To be specific, the adding unit 53AD adds the output of the first LPFa and the output of the first HPFa, whereby the first posture angle θ1 is obtained. In step S109, the second complementary filter 54 obtains the second posture angle θ2. To be specific, the adding unit 54AD adds the output of the second LPFb and the output of the second HPFb, whereby the second posture angle θ2 is obtained. The order of steps S108 and S109 is interchangeable.

The processing proceeds to step S110, and the processing unit 55C of the switching unit 55 illustrated in FIG. 4 proceeds with processing to step S111 when the excavator 100 is in the quasi-stationary state (Yes in step S110). In step S111, the processing unit 55C controls the switcher 55S so that the sensor control device 24 outputs the first posture angle θ1 as the posture angle θo of the excavator 100. In step S112, when the excavator 100 is in the dynamic state (No in step S110), the processing unit 55C controls the switcher 55S so that the sensor control device 24 outputs the second posture angle θ2 as the posture angle θo of the excavator 100.

Evaluation Example

Figure 11:
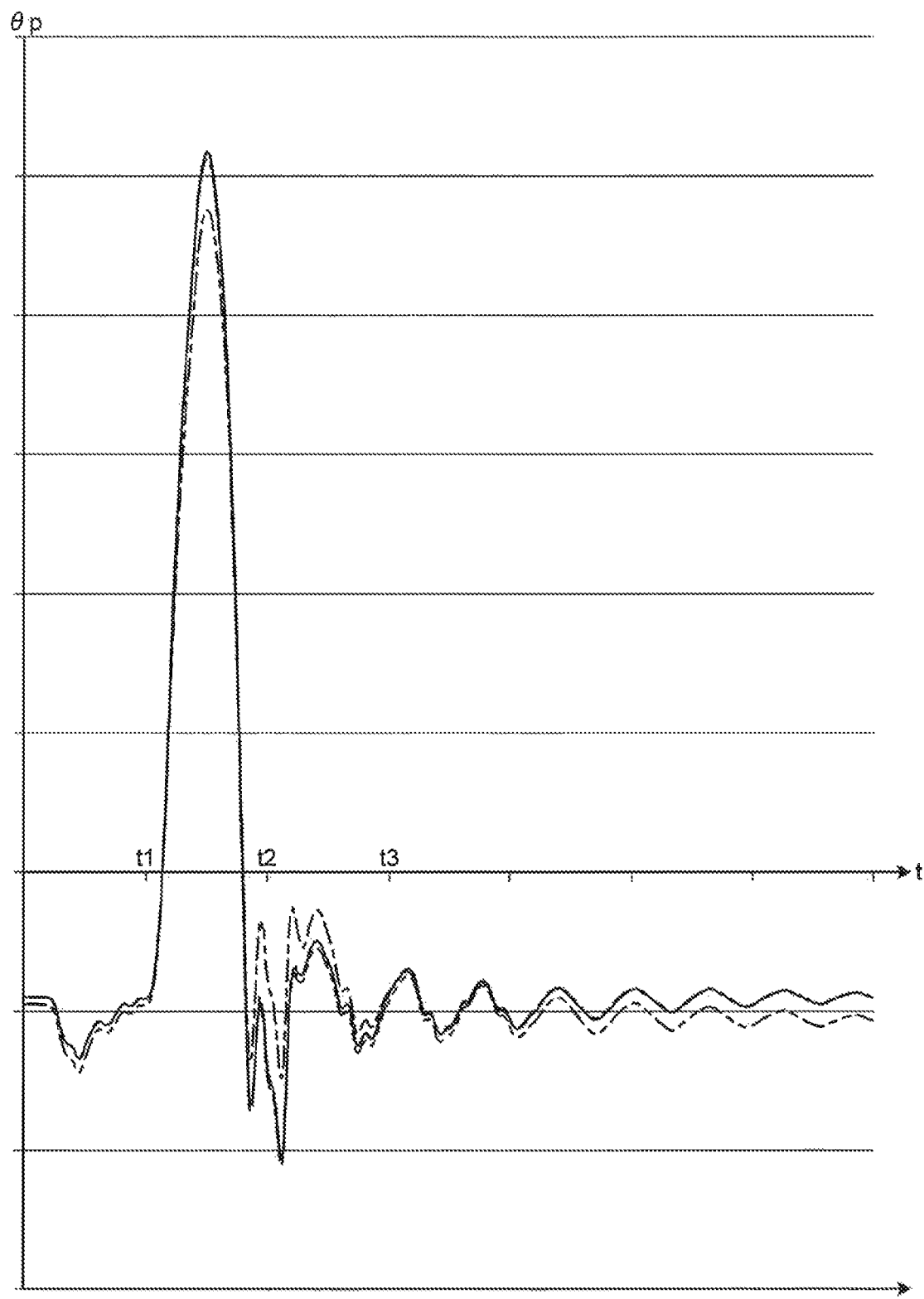
FIG. 11 is a diagram illustrating an example of a result of when a posture angle is switched according to a state of the IMU.

FIG. 11 is a diagram illustrating an example of a result of when the posture angle θo output according to the operation state of the excavator 100 is switched. The vertical axis of FIG. 11 is a pitch angle θp that is one of the posture angles θo, and the horizontal axis is a time t. The solid line in FIG. 11 is the pitch angle θp of the excavator 100, the dashed line is the first posture angle θ1, and the two-dot chain line is the second posture angle θ2. The example of FIG. 11 illustrates temporal change of the pitch angle θp of the excavator 100 from a state where the boom 6 of the excavator 100 illustrated in FIG. 1 is raised to a state where the boom 6 is lowered at once and is caused to stand still. The bucket 8 is not grounded when the boom 6 is lowered and stopped.

The boom 6 is stopped at the time t1, and movement around the Y-axis of the excavator 100, that is, pitching is caused. It is found out that the first posture angle $\theta 1$ is output as the posture angle $\theta o$ when the pitching is not caused in the excavator 100 (on and before the time t1), and the second posture angle $\theta 2$ is output as the posture angle $\theta o$ during a period in which the pitching is generated in the excavator 100 (a predetermined period on and after the time t1).

From the time t2 to the time t3, swing-over is caused in the excavator 100. It is found out that, after it is determined to be in the quasi-stationary state because the pitching is stopped (on and after the time t2), the posture angle $\theta o$ gradually approaches the first posture angle $\theta 1$, and at the time t3, the posture angle $\theta o$ nearly coincides with the first posture angle $\theta 1$. After it is determined to be in the quasi-stationary state, the second posture angle $\theta 2$ has a different value from the first posture angle $\theta 1$ because of the accumulation of errors due to integration. In the present embodiment, after the pitching is stopped, the first posture angle $\theta 1$ is made to the posture angle $\theta o$ of the excavator 100, and thus the influence of the integration error can be suppressed.

The present embodiment uses the first complementary filter 53 to which the first cutoff frequency is set and the second complementary filter 54 to which the second cutoff frequency different from the first cutoff frequency is set. The first complementary filter 53 decreases the error (noise) accumulated by integration of the angle speed $\omega$, and the second complementary filter 54 decreases the errors (noise) accumulated due to the acceleration other than the gravity acceleration. In the present embodiment, the posture angle output by the first complementary filter 53 and the posture angle output by the second complementary filter 54 are switched according to the operation state of the excavator 100. As a result, the posture angle $\theta o$ of the excavator 100 is obtained with an appropriate complementary filter according to the operation state of the excavator 100. Therefore, the decrease in the accuracy of the posture angle $\theta o$ can be suppressed in both of the dynamic state and the quasi-stationary state.

A highly accurate IMU 29 is expensive, and a cheap IMU 29 has relatively low accuracy. The present embodiment can suppress the decrease in the accuracy of the posture angle $\theta o$ in both of the dynamic state and the quasi-stationary state even if an IMU 29 having low accuracy is used. Therefore, the decrease in the accuracy of the posture angle $\theta o$ is suppressed and the manufacturing cost of the excavator 100 can be decreased.

The present embodiment and its modification have been described. The present embodiment and its modification are not limited by the above-described content. Further, the above-described configuration elements include matters easily arrived at by a person skilled in the art, matters substantially the same, and matters within the scope of equivalents. Further, the above-described configuration elements can be appropriately combined. Further, at least one of various omissions, replacements, changes of the configuration elements can be made without departing from the gist of the present embodiment and its modification. For example, the working machine 2 includes the boom 6, the arm 7, and the bucket 8. However, the attachment mounted on the working machine 2 is not limited thereto and not limited to the bucket 8. The working machine is not limited to the excavator 100. For example, the posture calculation device according to the present embodiment can be applied to a bulldozer, a motor grader, a dumptruck, or the like, and the working machine control, the traveling control, and the like can be executed.

While, in the present embodiment, the first complementary filter 53 and the second complementary filter 54 are used, a third complementary filter in which a third cutoff frequency different from the first and second cutoff frequencies is set may be added, or a fourth complementary filter in which a fourth cutoff frequency different from the first to third cutoff frequencies is set may be added. That is, the number of complementary filters having different cutoff frequencies is not limited to two.

REFERENCE SIGNS LIST

1 vehicle body
2 working machine
3 upper swing body
4 operator cab
5 traveling device
6 boom
7 arm
8 bucket
8T edge
20, 21 antenna
23 position detection device
24 sensor control device
25 working machine control device
26 engine control device
27 pump control device
28 first display device
28M display unit
29 IMU
29A acceleration sensor
29V gyro
30 operation device
35 various sensors
36 engine
37 hydraulic pump
38 hydraulic control valve
39 second display device
41, 42 in-vehicle signal line
51 first posture angle calculation unit
52 second posture angle calculation unit
53 first complementary filter
53F filter unit
53AD adding unit
54F filter unit
54AD adding unit
54 second complementary filter
55 switching unit
55C processing unit
55S switcher
100 excavator
TB table

The invention claimed is:
1. A posture calculation device of working machinery comprising:
   a measuring device provided in the working machinery, and configured to detect an angle speed and acceleration;
   a first posture angle calculation unit configured to obtain a posture angle of the working machinery from the acceleration detected by the measuring device;
   a second posture angle calculation unit configured to obtain a posture angle of the working machinery from the angle speed detected by the measuring device;

a complementary filter configured to output one of a first posture angle and a second posture angle, the first posture angle being calculated based on a first cutoff frequency that decrease a noise included in the posture angle obtained by the first posture angle calculation unit and the second posture angle calculation, the second posture angle being calculated based on a second cutoff frequency that decrease a noise included in the posture angle obtained by the first posture angle calculation unit and the second posture angle calculation, the second cutoff frequency being different from the first cutoff frequency; and a switching unit configured to switch between the first posture angle and the second posture angle to output the first posture angle or the second posture angle according to operation information of the working machinery.

2. The posture calculation device of working machinery according to claim 1, wherein
the working machinery includes an upper swing body, a traveling device, and a work machine, and
the operation information includes information of whether the upper swing body swings, information of whether the traveling device is operated, or information of whether the work machine is operated.

3. The posture calculation device of working machinery according to claim 1, wherein the first cutoff frequency is higher than the second cutoff frequency.

4. The posture calculation device of working machinery according to claim 3, wherein the switching unit outputs the first posture angle when having determined that the working machinery is in a quasi-stationary state, and outputs the second posture angle when having determined that the working machinery is in a dynamic state.

5. The posture calculation device of working machinery according to claim 1, wherein, after switching from the first posture angle to the second posture angle, the switching unit corrects the second posture angle using a value obtained by subtracting of the second posture angle from the first posture angle at a time of switching as a correction value.

6. The posture calculation device of working machinery according to claim 5, wherein, after switching from the second posture angle to the first posture angle, the switching unit corrects the first posture angle using a value obtained by multiplying of an first error of the second posture angle at the time of switching by a coefficient that is larger than 0 and smaller than 1 as a correction value.

7. The posture calculation device of working machinery according to claim 1,
wherein the complementary filter is a first complementary filter which includes:
a first filter unit to filter the posture angles and output filtered posture angles, and a first adding unit to add the filtered posture angles and output the first posture angle, and
the posture angle calculation device further comprises a second complementary filter which includes:
a second filter unit to filter the posture angles and output filtered posture angles, and a second adding unit to add the filtered posture angles and output the second posture angle.

8. The posture calculation device of working machinery according to claim 7,
wherein the first filter unit includes a first low pass filter and a first high pass filter, and the second filter unit includes a second low pass filter and a second high pass filter.

9. The posture calculation device of working machinery according to claim 8,
wherein the first and second low pass filters receive the posture angle from the first posture calculation unit, the first and second high pass filters receive the posture angle from the second posture calculation unit, the first adding unit adds the outputs from the first low and high pass filters to produce the first posture angle, and the second adding unit adds the outputs from the second low and high pass filters to produce the second posture angle.

10. The posture calculation device of working machinery according to claim 3, wherein
the switching unit determines that working machinery is in a quasi-stationary state when a standard deviation of the first posture angle is smaller than a first threshold set in advance in a predetermined period before a timing at which determination of switching is made and when a magnitude of the acceleration other than gravity acceleration is smaller than a second threshold set in advance.

* * * * *